United States Patent [19]

Madgavkar et al.

[11] Patent Number: 5,089,541
[45] Date of Patent: Feb. 18, 1992

[54] REMOVAL OF HYDROGENATION CATALYST FROM POLYMER SOLUTIONS BY CONTACT WITH ACTIVATED CARBON

[75] Inventors: Ajay M. Madgavkar, Edwardsville, Ill.; David W. Daum, Seabrook; Carma J. Gibler, Houston, both of Tex.

[73] Assignee: Shell Oil Company, Houston, Tex.

[21] Appl. No.: 617,225

[22] Filed: Nov. 23, 1990

[51] Int. Cl.⁵ .............................................. C08G 63/91
[52] U.S. Cl. ..................................... 523/310; 528/483
[58] Field of Search .......................... 523/310; 528/483

[56] References Cited

U.S. PATENT DOCUMENTS

| | | | |
|---|---|---|---|
| 2,935,499 | 5/1960 | Albright et al. | 528/493 |
| 3,554,991 | 1/1971 | Griffith | 260/88.7 |
| 4,028,485 | 6/1977 | Poloso et al. | 528/486 |
| 4,098,991 | 7/1978 | Kang | 528/492 |
| 4,278,506 | 7/1981 | Irvin | 203/68 |
| 4,471,099 | 9/1984 | Trepka | 525/338 |
| 4,595,749 | 6/1986 | Hoxmeier | 528/483 |

OTHER PUBLICATIONS

Hawley, 1987 Condensed Chemical Dictionary; pp. 218, 219, 1987.

*Primary Examiner*—Paul R. Michl
*Assistant Examiner*—John J. Guarriello

[57] ABSTRACT

A process is provided comprising the steps of contacting a polymer solution which contains Group VIII metal hydrogenation catalyst residue with molecular oxygen, contacting the polymer solution with activated carbon, and recovering a polymer cement comprising less than 5 ppm by weight, based on the solution of Group VIII metals.

22 Claims, No Drawings

REMOVAL OF HYDROGENATION CATALYST FROM POLYMER SOLUTIONS BY CONTACT WITH ACTIVATED CARBON

FIELD OF THE INVENTION

This invention relates to a process to prepare hydrogenated polymers. More particularly, the invention relates to the removal of residues of Group VIII metal containing hydrogenation catalysts from polymer solutions.

BACKGROUND OF THE INVENTION

The uses of polymeric materials, including diolefin polymers, continues to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultra violet degradation. Polymer hydrogenation processes have therefore been studied for many years as a method to prepare novel materials with excellent stability and other desirable properties. Early polymer hydrogenation processes utilized heterogeneous catalysts which were known to be useful for hydrogenation of low molecular weight olefins and aromatics. These catalyst systems included catalysts such as nickel on kieselguhr. A fine catalyst powder was preferred and large amounts of catalysts were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Discovery of nickel octoate/triethyl aluminum hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated butadiene-styrene polymers that are used as viscosity index improvers in premium motor oils. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation when homogeneous catalysts are utilized. The hydrogenation process is rapid and complete in a matter of minutes. However, removal of the catalyst from the polymer product is necessary because metals, particularly nickel, which remain with the polymer catalyze degradation of the polymer product. The removal of the catalyst from the polymer solution is commonly accomplished by the addition of an ammonium phosphate-water solution and air, which oxidizes the nickel to a divalent state. The mixed nickel-aluminum phosphate can then be removed from the hydrogenated polymer solution by filtration.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as disclosed by U.S. Pat. No. 4,028,485. These processes involve contacting the polymer solution with compounds which contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because those processes require relatively expensive metallurgy due to the corrosive nature of the compounds. Many also require the consumption of a continuous stream of reactants, and produce a sludge containing the catalyst and residues of the treatment chemicals.

It is therefore an object of this invention to provide a process to remove Group VIII metal hydrogenation catalyst residue from polymer solutions. It is a further object of this invention to provide a process to remove hydrogenation catalyst residue from polymer solutions wherein the process does not require the treatment of the polymer solution with phosphate compounds. In another aspect, it is an object of this invention to provide a process which is capable of removing catalyst residue from polymer solutions to a level of 5 ppm or less of Group VIII metal based on the solution. It is a further object to provide such a process which does not introduce a soluble contaminant into the polymer solution.

SUMMARY OF THE INVENTION

The objects of this invention are accomplished by a process comprising the steps of contacting a polymer solution which contains Group VIII metal hydrogenation catalyst residue with molecular oxygen to provide an oxidized solution, contacting the oxidized solution with activated carbon, and recovering a polymer solution comprising less than 5 ppm by weight, based on the total polymer solution, of Group VIII metals. Activated carbon, when utilized in conjunction with molecular oxygen, promotes the agglomeration of the nickel and results in a suspension of solids which is readily separable from the polymer solution. Further, being physically separable solids, the carbon black does not contaminate the polymer or require an additional purification step other than the physical separation.

DETAILED DESCRIPTION OF THE INVENTION

The activated carbon which is useful in the present invention may be granular or powdered. They may be prepared from a wide variety of materials. Activated carbons prepared for either gas adsorption services or liquid adsorption services are acceptable. Although carbons prepared for liquid adsorption services are preferred, either is suitable for the practice of the present invention.

Almost any carbonaceous material of animal, plant, or mineral origin can be converted to activated carbon if properly treated. Activated carbon has been prepared from the blood, flesh and bones of animals. Activated carbon has also been made from materials of plant origin, such as hardwood and softwood, corncobs, kelp, coffee beans, rice hulls, fruit pits, nutshells, and wastes such as lignin. Activated carbon has also been made from peat, lignite, soft and hard coals, tars and pitches, asphalt, petroleum residues, and carbon black. For economic reasons lignite, coal, bones, wood, peat, and paper mill waste (lignin) are most often used for the manufacture of liquid adsorbent carbons and coconut shells, coal, and petroleum residues are used for the manufacture of gas-adsorbent carbons.

Activation of the raw material is usually accomplished by either chemical activation or gas activation. Chemical activation depends upon the action of inorganic chemical compounds, either naturally present or added to the raw material, to degrade or dehydrate the organic molecules during carbonization. Gas activation depends upon selective oxidation of the carbonaceous matter with air at low temperature, or steam, carbon dioxide, or flue gas at high temperature. The oxidation is usually preceded by a primary carbonization of the raw material. Carbon prepared by either method may be utilized in this invention.

Decolorizing carbons are coal and lignite based granules, or light, fluffy powders derived from low density starting materials such as sawdust or peat. Many decolorizing carbons are prepared by chemical activation. Some raw materials, such as bones, contain inorganic salts that impart some degree of activity to the carbon when the raw material is simply carbonized or heated in an inert atmosphere. Decolorizing carbons are usually prepared by admixing or impregnating the raw material with chemicals that yield oxidizing gases when heated or that degrade the organic molecules by dehydration. Compounds used successfully are alkali metal hydrides, carbonates, sulfides, and sulfates; alkaline earth carbonates, chlorides, sulfates, and phosphates; zinc chloride; sulfuric acid; and phosphoric acid.

Gas and vapor adsorbing carbons may be prepared by the chemical activation process using sawdust or peat as raw material and phosphoric acid, zinc chloride, potassium sulfide, or potassium thiocyanate as the activator. In some cases, the chemically activated carbon is given a second activation with steam to impart physical properties not developed by chemical activation.

Processes involving selective oxidation of the raw material with air or gases are also used to make both decolorizing- and gas-adsorbing carbons. In both instances, the raw material can be activated in granular form. The raw material is carbonized first at 400°-500° C. to eliminate the bulk of the volatile matter and then oxidized with gas at 800°-1000° C. to develop the porosity and surface area. Some decolorizing carbons are oxidized with air at low temperature. But because this reaction is exothermic, it is difficult to control. The high temperature oxidation process with steam, carbon dioxide, or flue gas is endothermic, easier to control, and generally preferred.

Some gas adsorbing carbons are made from hard, dense starting materials such as nutshells and fruit pits. These are carbonized, crushed to size, and activated directly to give hard, dense granules of carbon. In other cases, it is advantageous to grind the charcoal, coal, or coke to a powder, form it into briquettes or pellets with a tar or pitch binder, crush to size, calcine at 500°-700° C., and then activate with steam or flue gas at 850°-950° C. This method gives more easily activated particles because they possess more entry channels or macropores for the oxidizing gases to enter and for the reaction products to leave from the center of the particles.

When activated carbon is produced from granular coal, the coal is typically carbonized in horizontal tunnel kilns, vertical retorts, or horizontal rotary kilns. Activation is accomplished in continuous internally or externally fired rotary retorts, or in large, cylindrical, multiple hearth furnaces where the charge is stirred and moved from one hearth to the next lower one by rotating rabble arms, or in large vertical retorts where the charge cascades over triangular ceramic forms as it moves downward through the furnace.

The activated carbon of the present invention is preferably a powder due to the greater availability of surface area. Granules could be utilized also, and are preferred if the contacting of the polymer solution and the activated carbon is accomplished in a fixed bed of activated carbon.

Activated carbon surfaces can be modified by treatment with strong oxidizing acids, resulting in an activated carbon with a higher oxygen content and which is less hydrophobic. A typical strong oxidizing acid is, a 2:1 volume ratio mixture of concentrated sulfuric acid and concentrated nitric acid. It has been found that activated carbon treated in this matter, and then water washed and dried, is not effective in the practice of the present invention. This oxidative treatment is to be distinguished from the acid wash treatments applied to many commercially available activated carbons.

The amount of activated carbon utilized is preferably between about 0.2 weight percent and about 10 weight percent, based on the total solution, for solutions containing about 200 ppm by weight of Group VIII metals. Lesser amounts will not remove a sufficient amount of metals whereas larger amounts are less economical. Increasing the amount of activated carbon can decrease the required contact time, as can dilution of the solution with a solvent such as cyclohexane, and increasing the temperature of the solution during contacting with the adsorbent.

The polymer solutions of the present invention preferably comprise from 1 to about 40 percent by weight of a polymer, and more preferably comprise from about 2 to about 20 percent by weight of polymer based on the total amount of solution. The polymer may be a partially, selectively, or totally hydrogenated polymer. The present invention does not depend upon the type of nature of the polymer. The polymer may therefore be a thermoplastic polymer, or an elastomeric polymer and may have a molecular weight which varies between wide limits. Most typically, polymers which are benefited by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched, radial, or star.

In a most preferred embodiment, the polymer is an anionically polymerized conjugated diolefin polymer which was anionically polymerized in an inert solvent, and then hydrogenated in the same solvent to form the hydrogenation catalyst residue containing polymer solution.

When an anionic initiator is used, polymers will be prepared by contacting the monomers with an organoalkali metal compound in a suitable solvent at a temperature within the range from about −100° C. to about 300° C., preferably at a temperature within the range from about 0° C. to about 100° C. Particularly effective polymerization initiators are organolithium compounds having the general formula:

$RLi_n$

Wherein:
R is an aliphatic, cycloaliphatic or aromatic hydrocarbon radical having from one to about 20 carbon atoms; and n is an integer from 1 to 4.

When the polymer is a block copolymer, the copolymer is preferably a styrene-conjugated diolefin block copolymer. This is due to the thermoplastic and elastomeric nature of these polymers. The polystyrene, being incompatible with the poly(conjugated olefins), form separate domains, and these domains have relatively high glass transition temperatures. Above the glass transition temperatures of the polystyrene domains the polymer is in a melt and can be molded, extruded or blended with other components. Below the glass transition temperature of the polystyrene, the hard polystyrene domains act as physical crosslinks between the rubbery polyconjugated diolefin chains. This results in excellent elastomeric properties.

The polymer of the present invention is contacted with hydrogenation catalyst and hydrogen in a solution with an inert solvent such as cyclohexane, normal hexane, diethyl ether, toluene or benzene. The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference.

Typically, between about 0.09 and about 10 mmoles of Group VIII metal is utilized per 100 g of polymer to be hydrogenated. This corresponds to about 0.1 to 13 mmoles of Group VIII metal per liter of solution.

The catalyst metals which are preferred include iron, cobalt, nickel and palladium. Nickel and cobalt are particularly preferred. Iron is not particularly preferred because it is less active than the others, and palladium is not particularly preferred because it is more expensive than nickel and cobalt. Lithium, magnesium and aluminum are preferred cocatalysts due to the excellent activity of the catalyst-cocatalyst systems which comprise those cocatalysts.

The hydrogenation catalyst residue containing polymer solution may be contacted with the activated carbon either in a continuous process or in a batch process. The activated carbon may be in a fixed bed with the polymer solution passing through the fixed bed, or the activated carbon may be in a moving bed, such as a fluidized bed or ebulated bed. The activated carbon may alternatively be agitated with the polymer solution and then separated. This mixing and separating may be performed in stages, the stages preferably being countercurrent. Typical fixed bed systems are not preferred because pellets which are sufficiently large to result in an acceptably low pressure drop do have limited surface area, and are not as efficient in the practice of this invention. Further, fixed beds have a tendency to plug with agglomerated catalyst particles.

When the activated carbon and the polymer solution are combined and agitated, the treated polymer solution may be recovered by any known means to separate solids from viscous liquids. Centrifugal means such as centrifuges or cyclones may be utilized. Filtering, preferably in the presence of a filter aid may also be utilized, along with gravity settlement such as decantation, or sedimentation in parallel plate separators. Filtering utilizing a filter aid is preferred because this method is known to be effective to separate fine particles from polymer solutions.

The polymer solution which contains Group VIII metal hydrogenation catalyst residue is contacted with molecular oxygen either before the solution is contacted with activated carbon, or simultaneously with the contact with activated carbon. It is known that oxidation of the Group VIII metals either permits or enhances removal of these catalyst residues in prior art hydrogenation catalyst removal processes, such as that disclosed in U.S. Pat. No. 4,595,749. In U.S. Pat. No. '749 this oxidation may be accomplished by contacting the polymer solution with a peroxide or with molecular oxygen. The present invention requires that the oxidation be accomplished with molecular oxygen. Utilization of a peroxide as the oxidation agent was found to result in no separation of Group VIII metals from the polymer solutions upon contact with activated carbon. The molecular oxygen is preferably diluted with an inert gas such as nitrogen. Air is an acceptable molecular oxygen containing mixture, although more dilute mixtures, such as that comprising 3 percent of oxygen in nitrogen is preferred.

A larger amount of molecular oxygen will be required if the molecular oxygen is not intimately contacted with the polymer solution. When the molecular oxygen is sparged into a polymer solution, it is preferably sparged for a time period exceeding 1 minute and more preferably for a time period between about 30 and about 90 minutes. The polymer solution is preferably agitated while the molecular oxygen is being sparged into the polymer solution to enhance contact of the Group VIII metals with the oxygen.

The polymer solutions are preferably held at a temperature above ambient temperature while being contacted with molecular oxygen to enhance oxidation of the Group VIII metals. A preferred temperature range is from about 25° to about 120° C., and a more preferred temperature range is from about 60°. to about 90° C. Higher temperatures are undesirable due to degradation of the polymer, and excessive vaporization of the solvent whereas at lower temperatures, the oxidation proceeds only slowly due to mass transfer limitations.

The molecular oxygen is most preferably contacted with the polymer solution at an oxygen partial pressure between about 1 and about 200 psi, at a temperature of about 70° C., for about 60 minutes, and under conditions of agitation. These conditions render an oxidized Group VIII metal catalyst containing polymer solution wherein the Group VIII metals are readily removed by subsequent contact with activated carbon.

The removal of Group VIII metals from polymer solutions is quantitatively indicated by the color of the solutions. The polymer solutions which contain Group VIII metals are black. The treatment of these solutions according to this invention results in a mixture of black solids and clear liquid. The black solids are readily separated from the clear liquid by gravity settlement or other means of separating solids from viscous liquids. When the polymer solution is clear, the solution has consistently been found to contain less than 5 ppm of Group VIII metals, based on the solution.

The mechanism of the removal of the Group VIII metal ions from the polymer solution appears to be agglomeration of the catalyst residue particles into particles which are large enough to be physically separated from the polymer solution. The catalyst particles do not appear to be adsorbed onto the activated carbon. This conclusion is based on observations that when granules of activated carbon are mixed with the oxidized polymer solutions, two sizes of black particles and a clear polymer solution result. The smaller particles contain a significant portion of the catalyst metals and do not contain activated carbon. Advantage could be taken of this mechanism by recycling and reusing granules of activated carbon by classifying the solids after the treated polymer solution is recovered from the solids. The larger solids comprise reusable activated carbon granules and the smaller solids contain catalyst residues.

EXAMPLES

The effectiveness of activated carbon in removal of hydrogenation catalyst residues from polymer cements was demonstrated by preparing a solution of isoprene monomer, hydrogenating the isoprene monomer with a nickel hydrogenation catalyst, subjecting the solution to varying oxidative conditions and contacting the hydrogenated monomer solution with activated carbon, and then separating the monomer solution from a residue of activated carbon hydrogenation catalyst residue by gravity settlement and decanting off the clear liquids. The hydrogenated monomer solutions were clear indicating an acceptably low level of residual nickel. Cyclohexane was used as the solvent, and the initial solutions were 5 percent by weight isoprene. The activated carbon utilized was a 12×20 mesh DARCO activated carbon. This activated carbon is available from American Norit Company. It is a granular acid washed, lignite-based activated carbon.

The initial isoprene solutions were hydrogenated by adding 200 ppm by weight, based on the total solution, nickel as nickel (2-ethylhexanoate) and triethylaluminum. The solution was then held at about 90° C. under about 700 psi hydrogen partial pressure for about 120 minutes to accomplish hydrogenation of the isoprene.

The oxidation conditions included 3% $O_2$ in nitrogen, hydrogen peroxide at about a 10:1 mole ratio of hydrogen peroxide to nickel, and no oxidation. The oxidation by the 3% oxygen in nitrogen was accomplished by sparging the hydrogenated monomer solution with a 3% oxygen in nitrogen stream for one hour while agitating the solution. When hydrogen peroxide was used as an oxidative agent, the hydrogen peroxide was added to the hydrogenated isoprene solution and agitated for one hour before the activated carbon was added.

Activated carbon was then added to the hydrogenated isoprene solution in weight ratios of 10:1, 50:1, or 150:1 of solution to activated carbon and rolled in bottles for 2 to 3 days. The samples were then allowed to gravity settle overnight.

It was found that only oxidation with molecular oxygen and contact with activated carbon resulted in clear solution phases. Clear solutions were obtained under these conditions for each weight ratio of solution to activated carbon. This example demonstrates the effectiveness of activated carbon when used in conjunction with oxidation by molecular oxygen in remaining Group VIII metal hydrogenation catalyst resides from solutions.

Table 1 below summarizes the results of this example.

TABLE 1

| Sample | Solution to Activated Carbon Weight Ratio | Oxidation Agent | Clear Solution |
|---|---|---|---|
| 1 | 10:1 | None | No |
| 2 | 50:1 | None | No |
| 3 | 150:1 | None | No |
| 4 | 10:1 | $O_2$ | Yes |
| 5 | 50:1 | $O_2$ | Yes |
| 6 | 150:1 | $O_2$ | Yes |
| 7 | 10:1 | Peroxide | No |
| 8 | 50:1 | Peroxide | No |
| 9 | 150:1 | Peroxide | No |

What is claimed is:

1. A process comprising the steps of:
   a) contacting a polymer solution which contains Group VIII metal hydrogenation catalyst residue with molecular oxygen to form an oxidized solution;
   b) contacting the oxidized solution with activated carbon; and
   c) recovering a polymer solution comprising less than 5 ppm by weight, based on the polymer solution, of Group VIII metal.

2. The process of claim 1 wherein the hydrogenation catalyst was prepared by combining a Group VIII metal carboxylate or alkoxide with an alkyl or hydrate of a metal selected from Groups I-A, II-A and III-B of Medeleev's Periodic Table of Elements.

3. The process of claim 1 wherein the hydrogenation catalyst is prepared by combining a component selected from the group comprising nickel carboxylate, nickel alkoxide, cobalt carboxylate, iron alkoxide, palladium carboxylate and palladium alkoxide with a component selected from the group consisting of lithium alkyl, lithium hydrate, magnesium alkyl, magnesium hydrate, aluminum alkyl and aluminum hydrate.

4. The process of claim 1 wherein the hydrogenation catalyst is prepared by combining nickel (2-ethylhexanoate) and an aluminum alkyl.

5. The process of claim 4 wherein the aluminum alkyl is triethylaluminum.

6. The process of claim 1 wherein molecular oxygen is present when the activated carbon is contacted with the oxidized solution.

7. The process of claim 1 wherein the hydrogenation catalyst residue is in the form of a colloidal suspension.

8. The process of claim 1 wherein the polymer solution comprises from about 1 to about 40 percent by weight polymer based on the total polymer solution, in an inert solvent.

9. The process of claim 1 wherein the inert solvent is selected from the group consisting of cyclohexane, toluene, hexane, benzene and diethyl ether.

10. The process of claim 1 wherein the polymer is an hydrogenated polymer comprising, before hydrogenation, conjugated diolefin monomer units.

11. The process of claim 10 wherein the polymer is a copolymer comprising, before hydrogenation, conjugated diolefin units and styrene.

12. The process of claim 11 wherein the copolymer is a block copolymer comprising at least one block which comprises predominately, before hydrogenation, monomer units of conjugated diolefins and at least one block which comprises styrene monomer units.

13. The process of claim 8 wherein the polymer is anionically polymerized in the inert solvent prior to hydrogenation of the polymer.

14. The process of claim 1 wherein the molecular oxygen is sparged into the polymer solution while the solution is agitated.

15. The process of claim 14 wherein the molecular oxygen is contacted with the hydrogenation catalyst residue containing polymer cement by sparging a gas stream comprising oxygen through the polymer cement.

16. The process of claim 15 wherein the gas stream comprises a major portion of nitrogen and a minor portion of oxygen.

17. The process of claim 1 wherein the polymer cement comprising less than 5 ppm of the hydrogenation catalyst residue Group VIII metals is recovered by filtration.

18. The process of claim 17 wherein the filtration is performed utilizing a filter aid.

19. The process of claim 1 wherein the polymer comprising less than 1 ppm of the hydrogenation catalyst residue Group VIII metals is recovered by gravity settlement.

20. The process of claim 1 wherein the polymer comprising less than 5 ppm of the hydrogenation catalyst residue Group VIII metals is recovered by centrifugation.

21. The process of claim 1 wherein the polymer solution comprising less than 5 ppm of Group VIII metal is recovered by separation of solids from the solution, and further comprising the step of separating the solids into activated carbon particles and agglomerated hydrogenation catalyst particles by a physical separation.

22. The process of claim 21 wherein at least a portion of the activated carbon particles are reused in the process.

* * * * *